(12) United States Patent
Shimoda

(10) Patent No.: US 12,225,164 B2
(45) Date of Patent: Feb. 11, 2025

(54) IMAGE PROCESSING SYSTEM, RELAY SERVER, AND NON-TRANSITORY COMPUTER-READABLE STORAGE MEDIUM

(71) Applicant: CANON KABUSHIKI KAISHA, Tokyo (JP)

(72) Inventor: Taiga Shimoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/345,882

(22) Filed: Jun. 30, 2023

(65) Prior Publication Data
US 2024/0015252 A1     Jan. 11, 2024

(30) Foreign Application Priority Data
Jul. 5, 2022 (JP) ................. 2022-108148

(51) Int. Cl.
*H04N 1/00* (2006.01)
*G06F 3/12* (2006.01)

(52) U.S. Cl.
CPC ....... *H04N 1/00464* (2013.01); *G06F 3/1204* (2013.01); *G06F 3/1253* (2013.01); *G06F 3/1288* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2011/0161823 A1* | 6/2011 | Miyata | H04N 1/00482 715/733 |
| 2012/0268778 A1* | 10/2012 | Nakawaki | G06F 3/122 358/1.15 |
| 2020/0045205 A1* | 2/2020 | Wayama | H04N 1/0048 |
| 2020/0389565 A1* | 12/2020 | Naya | H04N 1/00474 |
| 2020/0404004 A1* | 12/2020 | Tomioka | H04L 63/083 |
| 2021/0357158 A1* | 11/2021 | Furuta | G06F 3/122 |
| 2021/0357159 A1* | 11/2021 | Furuta | G06F 3/1285 |

FOREIGN PATENT DOCUMENTS

JP         2019165427 A      9/2019

* cited by examiner

*Primary Examiner* — Helen Zong
(74) *Attorney, Agent, or Firm* — Canon U.S.A., Inc. IP Division

(57) ABSTRACT

A relay server that relays a service provided by a service server transmits information about a screen to be displayed on a web browser of an image processing apparatus to the image processing apparatus, determines a display mode during execution of a job relating to the service by a local application of the image processing apparatus, and transmits the job and information about the determined display mode to the image processing apparatus.

8 Claims, 29 Drawing Sheets

FIG.12

```
{
  "id": "SCN_JOB_ID_12345",
  "jobType": "Scan",
  "jobName": "JobName - sample.pdf",
  "appId": "ApplicationId000",
  "date": "2022-06-15T22:10:15.123Z",
  "tickets": [
    {
      "name": "ScanSize",
      "value": "ISOA4"
    },
    {
      "name": "Resolution",
      "value": "300"
    },
    ]
}
```

1200
1201 "id": "SCN_JOB_ID_12345"
1202 "jobType": "Scan"
1203 "jobName": "JobName - sample.pdf"
1204 "appId": "ApplicationId000"
1205 "date": "2022-06-15T22:10:15.123Z"
1206 "tickets": [

FIG.15

| APPLICATION | DISPLAY MODE |
|---|---|
| STORAGE SERVICE 1 | [] |
| STORAGE SERVICE 2 | [] |
| SCAN SERVICE 1 | ["WORK MODE", "STUDY MODE"] |
| PRINT/SCAN SERVICE | ["WORK MODE"] |
| | |

FIG.22

```
{
  "id": "SCN_JOB_ID_12345",
  "jobType": "Scan",
  "jobName": "JobName - sample.pdf",
  "appId": "ApplicationId000",
  "date": "2022-06-15T22:10:15.123Z",
  "displayMode": "WorkMode",
  "tickets": [
    {
      "name": "ScanSize",
      "value": "ISOA4"
    },
    {
      "name": "Resolution",
      "value": "300"
    },

]
}
```

2200

2201 → "displayMode": "WorkMode",

IMAGE PROCESSING SYSTEM, RELAY SERVER, AND NON-TRANSITORY COMPUTER-READABLE STORAGE MEDIUM

BACKGROUND

Field of the Disclosure

The present disclosure relates to an image processing system, a relay server, and a non-transitory computer-readable storage medium for making it easy for a user to identify whether a job is a job input from a cloud service or a job input from a source other than the cloud service.

Description of the Related Art

Multi-function peripherals (MFPs) have been available with a function of printing electronic data on sheets and a function of reading (scanning) paper documents and generating electronic data, at low prices. Such MFPs have been widely used not only in offices but also in homes. Some MFPs further include a function of connecting to networks and/or provide user interfaces (UIs) for displaying an operation screen on a liquid crystal panel to receive user operations.

Japanese Patent Application Laid-Open No. 2019-165427 discusses a multi-function peripheral (MFP) in which a vendor application developed by a third vendor is installed. The vendor application calls a function-providing application for configuring settings of a print function of the MFP via an application programming interface (API) when the vendor application uses the print function of the MFP. Furthermore, the vendor application notifies the function-providing application of user interface (UI) parameters so that a UI displayed by the vendor application and a UI displayed by the function-providing application called via the API are displayed in a common display form.

SUMMARY

According to an aspect of the present disclosure, an image processing system includes a relay server configured to relay a service provided by a service server, and an image processing apparatus including a local application configured to control execution of a job received from the relay server. The relay server and the image processing apparatus are connected together via a network. The relay server includes a first network communication unit, one or more memories, and one or more processors. The one or more processors and the one or more memories of the relay server are configured to cause the relay server to transmit, to the image processing apparatus, information about a screen to be displayed on a web browser of the image processing apparatus; determine a display mode during execution of the job; and transmit, to the image processing apparatus, the job and information about the display mode determined. The image processing apparatus includes a second network communication unit, one or more memories, and one or more processors. The one or more processors and the one or more memories of the image processing apparatus are configured to cause the image processing apparatus to implement the web browser configured to control the display of the screen based on the information about the screen to be displayed on the web browser transmitted by the relay server, and the local application configured to control the display of the screen during execution of the job based on the job and the information about the display mode transmitted by the relay server.

Further features of various embodiments will become apparent from the following description of exemplary embodiments with reference to the attached drawings.

BRIEF DESCRIPTION OF THE DRAWINGS

FIG. 12 illustrates an example of scan job parameter information.

FIG. 15 is a diagram illustrating display modes displayed by a browse application.

FIG. 22 illustrates an example of parameter information transmitted from the relay server to the MFP in executing a scan job.

DESCRIPTION OF THE EMBODIMENTS

There is a multi-function printer (MFP) that includes a web browser and has a function of displaying screens provided by web servers using the web browser. With such an MFP, a user operates a user interface (UI) screen provided by a server, and connects the MFP to a cloud service so that jobs can be input from the cloud service to the MFP.

In examples according to exemplary embodiments described below, an MFP having received a job from a cloud service processes the job using a local application installed in advance in the MFP. As described below, the local application displays a job processing status on a screen such that the user can easily identify whether the job being processed is a job that has been input from the cloud service or a job that has been input from a source other than the cloud service.

Figure 1:
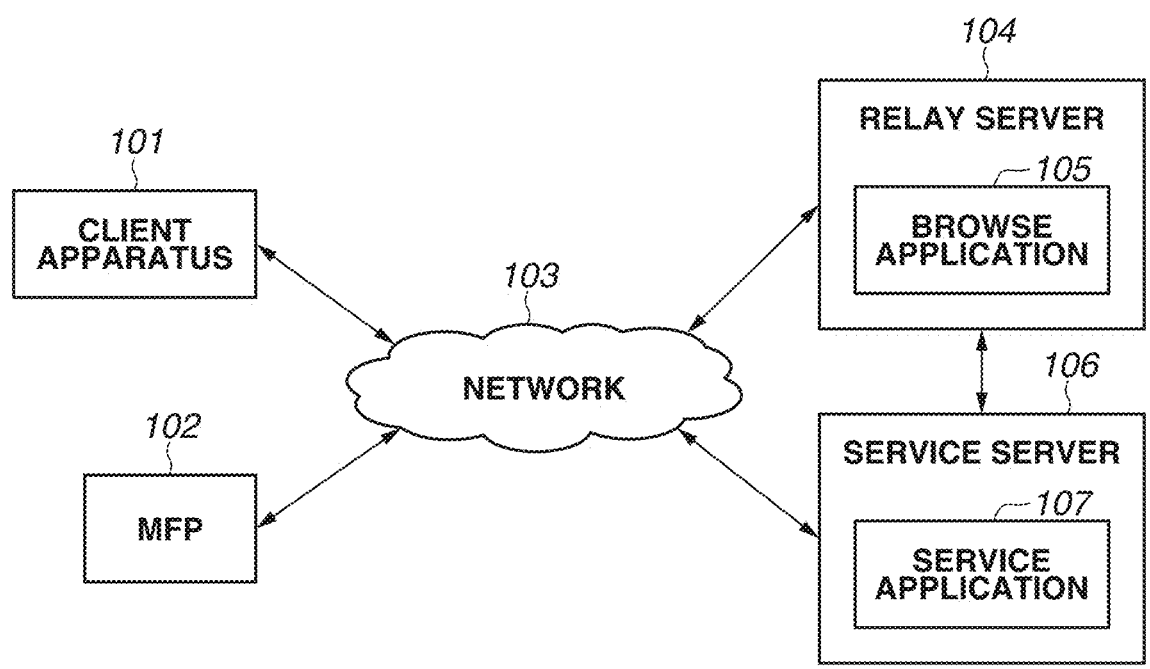
FIG. 1 is a diagram illustrating an example of a configuration of a service coordination system.

FIG. 1 is a diagram illustrating a configuration of a service coordination system including a relay server according to a first exemplary embodiment. In the service coordination system illustrated in FIG. 1, a client apparatus 101, an MFP 102, a relay server 104, and a service server 106 are connected together via a network 103.

The network 103 is, for example, a local area network (LAN), a wide area network (WAN), a telephone line, or a dedicated digital line. Further, the network 103 can be an asynchronous transfer mode (ATM) or frame relay circuit, a cable television line, or a wireless line for data broadcasting. Alternatively, the network 103 can be a so-called communication network realized by a combination thereof, such as the Internet.

The client apparatus 101 and the MFP 102 are connected to the network 103 (Internet) via an access point. The client apparatus 101 and the MFP 102 each include a web browser and display webpages provided by a browse application 105 of the relay server 104 using the web browser, so that a user can use web services.

The relay server 104 relays data transmission/reception when accessed by the client apparatus 101 and the MFP 102 so that services provided by a service application 107 (described below) can be used.

The relay server 104 includes the browse application 105, and the browse application 105 manages browsing of webpages by the client apparatus 101 and the MFP 102. Hereinafter, the client apparatus 101 and the MFP 102 will be referred to collectively as "client terminal". While the web browser installed in the client terminal displays webpages so that the user can browse the webpages as described below, a description "the client terminal displays webpages" is sometimes used for a simplification purpose in the present specification.

In the relay server 104, the browse application 105 realizes the function of managing browsing of webpages performed by the user using the web browser. The browse application 105 transmits predetermined webpages when accessed by the client apparatus 101 or the MFP 102. The predetermined webpages include webpages relating to various services provided by the service server 106. Specifically, in an example according to the present exemplary embodiment described herein, the client terminal does not acquire the webpages relating to various types of information provided by the service server 106 directly from the service server 106, but acquires the webpages through the browse application 105 to display the acquired webpages. Specifically, the client terminal displays the webpages provided by the browse application 105, so that information about various services provided by the service server 106 is indirectly provided to the user for browsing. For example, the client terminal displays information about a list of files managed by the service server 106 and information about a list of print jobs on webpages provided by the browse application 105 so that the user can browse the displayed information. The predetermined webpages also include a service login page for logging in to the service server 106 from the client terminal. The service login page is a webpage provided by the service server 106.

The service server 106 includes the service application 107. The service application 107 provides predetermined services to the client apparatus 101 and the MFP 102 via the relay server 104. Hereinafter, an "application for providing the predetermined services" will be referred to as a "service application". On the client apparatus 101 and the MFP 102, services provided by the service application 107 are used via the relay server 104. According to the present exemplary embodiment, the service application 107 manages, for example, image data and document file data of the user on the service server 106. The service application 107 further provides services for browsing the files on web browsers or other graphical user interfaces (GUIs). Alternatively, the service application 107 provides services for receiving image data and document files uploaded to the service server 106 via the relay server 104 or directly. The service application 107 also provides services for providing and updating file information via application programming interfaces (APIs).

Services provided by the service application 107 are not limited to those described above. The service application 107 can provide various publicly-known services. To use the service application 107, it is required to log in using pre-registered account information. According to the present exemplary embodiment, the login refers to a process of entering general account information, authenticating, and acquiring authentication information, and commonly-known Open Authorization (OAuth) can be used. Alternatively, a method by entering a personal identification number (PIN) code issued by the service application 107 on a terminal of the client apparatus 101 or the MFP 102 can be used.

Any other method by which pre-registered accounts can be identified can also be used.

According to the present exemplary embodiment, the browse application 105 of the relay server 104 transmits a webpage to the client apparatus 101 or the MFP 102, and thereby the client terminal (the client apparatus 101 or the MFP 102) displays the webpage. Thus, the user can browse the webpage displayed on the client terminal. The browse application 105 executes login processing to log in to the service application 107 on receipt of a user operation on a displayed webpage for service login on the client apparatus 101 or the MFP 102. The browse application 105 then acquires information about services provided by the service application 107 using authentication information after the login processing, generates webpages for using the services, and transmits the generated webpages to the client apparatus 101 or the MFP 102. In the service coordination system in FIG. 1 as described above, the relay server 104 including the browse application 105 and the service server 106 including the service application 107 communicate with each other and transmit results thereof to the client apparatus 101 and the MFP 102.

The client apparatus 101 can be any terminal, such as a smartphone, a tablet, or a general-purpose personal computer, in which web browsers can be installed.

Figure 2:
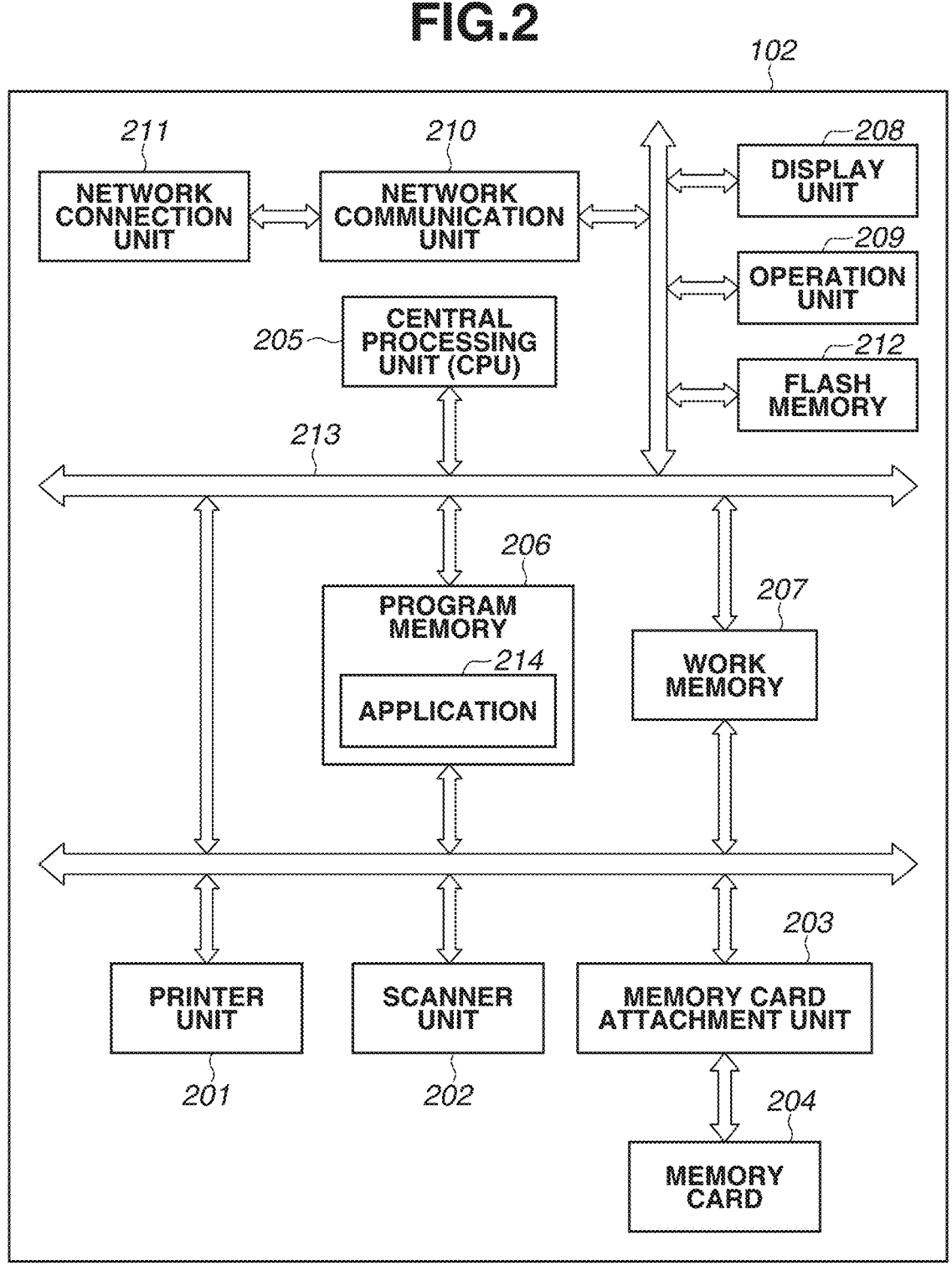
FIG. 2 is a block diagram illustrating a schematic configuration of a multi-function peripheral (MFP).

FIG. 2 is a block diagram illustrating a schematic configuration of the MFP 102 serving as an image processing apparatus. While MFPs are mainly described as an example of peripheral apparatuses in the present specification, any type can be used as long as the peripheral apparatus is an image processing apparatuses, such as a copy machine, a facsimile, or a printing apparatus, that can print on paper medium, or an image processing apparatus that includes a scanner unit to scan a paper medium and converts the scanning results into data.

A print function of the MFP 102 is realized by a printer unit 201. A scanner function of the MFP 102 is realized by a scanner unit 202. A storage function of the MFP 102 is realized by a memory card attachment unit 203 and a memory card 204.

The printer unit 201 prints image data received from external sources or image data stored in the memory card 204 on print sheets using a recording method, such as an inkjet method or an electrophotographic method. The printer unit 201 manages ink information including ink levels and sheet information including the number of stacked sheets.

The scanner unit 202 optically reads an original placed on a platen glass (not illustrated), converts the reading result into electronic data, converts the electronic data into image data in a designated file format, and transmits the image data to an external apparatus via the network 103 or stores the image data in a storage area (not illustrated), such as a hard disk drive (HDD). Further, a copy service is realized by transferring the image data generated by reading the original placed on the platen glass using the scanner unit 202 to the printer unit 201 and printing the transferred image data on a print sheet using the printer unit 201.

The memory card 204 attached to the memory card attachment unit 203 stores various types of file data. The file data can be read from an external apparatus via the network 103 and edited. File data can also be stored in the memory card 204 from the external apparatus.

The MFP 102 further includes a central processing unit (CPU) 205, a program memory 206, a work memory 207, a display unit 208, an operation unit 209, a network communication unit 210, a network connection unit 211, and a flash memory 212. The CPU 205 is a central processing unit for controlling each component in the MFP 102. The program memory 206 includes a read-only memory (ROM) and stores various program codes and an application 214 for communicating with a server apparatus. The application 214 includes an application for accessing the printer unit 201 and acquiring consumables information about inks and sheets, and an application for receiving and executing jobs from a web browser or the relay server 104. The work memory 207 includes a random access memory (RAM) and temporarily stores or buffers image data during service execution. The display unit 208 includes, for example, a liquid crystal display (LCD) and displays various types of information. The operation unit 209 includes switches to be used by the user to execute various input operations. The network communication unit 210 connects the MFP 102 to the network 103 and executes various types of communication. Connections to the network 103, such as the Internet, can be established via the network connection unit 211. The network communication unit 210 supports wired LANs and wireless LANs, and the network connection unit 211 for wired LANs is a connector for connecting a wired LAN cable, whereas the network connection unit 211 for wireless LANs is an antenna. The flash memory 212 is a non-volatile memory for storing image data received by the network communication unit 210. The foregoing components are connected to each other via a bus 213.

Figure 3:
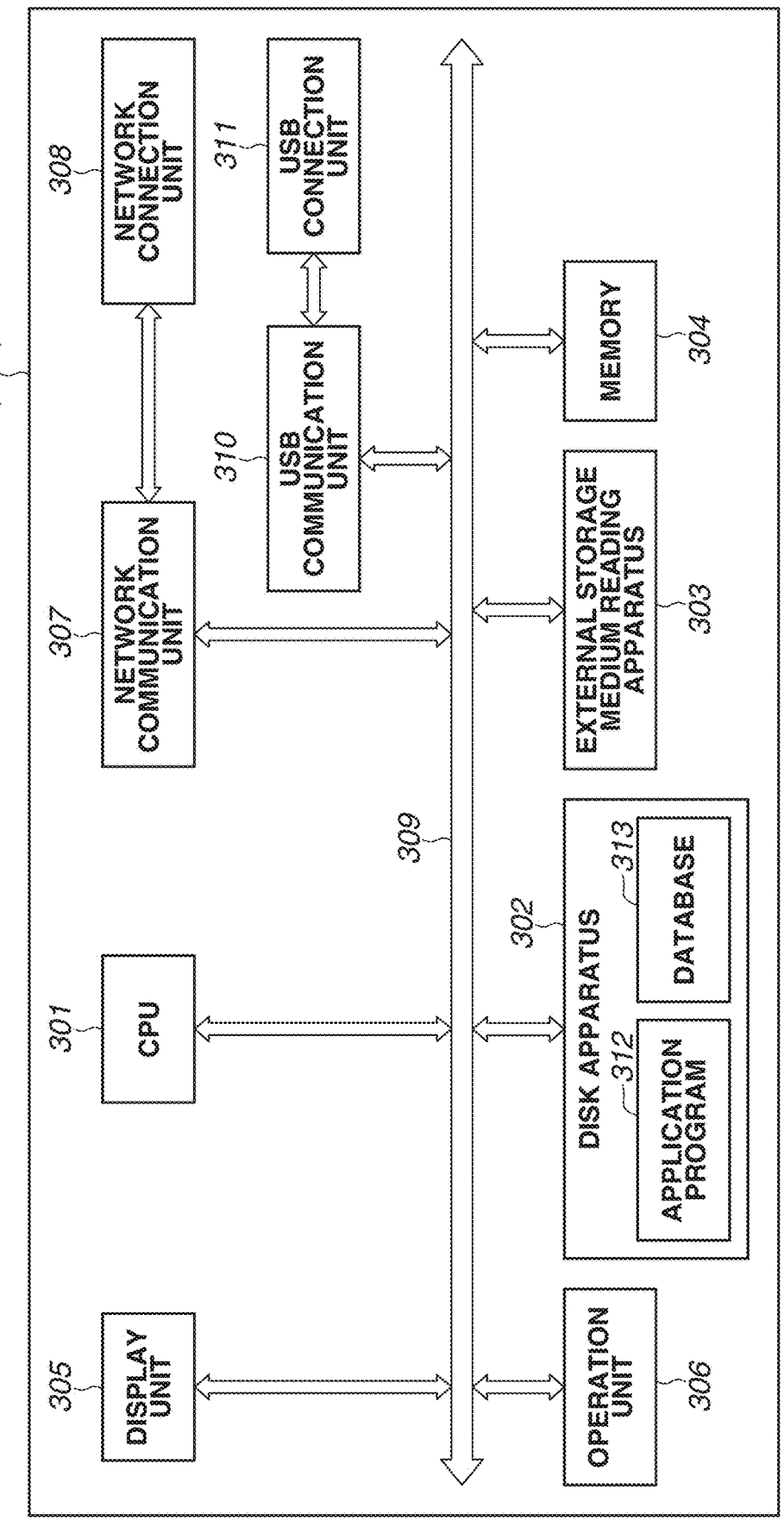
FIG. 3 is a block diagram illustrating a schematic configuration of a client apparatus, a relay server, and a service server.

FIG. 3 is a block diagram illustrating an example of a hardware configuration of an apparatus that can be used as the client apparatus 101, the relay server 104, and the service server 106.

A CPU 301 is a central processing unit for controlling the components described below. A disk apparatus 302 stores an application program 312, a database 313, and an operating system (OS) to be read by the CPU 301 and also stores various files. The application program 312 is a program for executing processing for the corresponding apparatus, and details of the processing to be executed for the client apparatus 101, details of the processing to be executed for the relay server 104, and details of the processing to be executed for the service server 106 are different from each other. An external storage medium reading apparatus 303 is an apparatus for reading information, such as files stored in an external storage medium like a secure digital (SD) card. A memory 304 is composed of a RAM or the like, and the CPU 301 temporarily stores or buffers data in the memory 304 as needed. A display unit 305 is composed of, for example, an LCD, to display various types of information. An operation unit 306 includes a keyboard and a mouse to be used by the user to perform various input operations. A network communication unit 307 connects to the network 103, such as the Internet, via a network connection unit 308 and executes various types of communication. The network communication unit 307 supports wired LANs and wireless LANs. The network connection unit 308 to be used for a wired LAN is a connector for connecting a wired LAN cable, whereas the network connection unit 308 for a wireless LAN is an antenna. A universal serial bus (USB) communication unit 310 connects to various peripheral apparatuses via a USB connection unit 311 and executes various types of communication. The foregoing components are connected to each other via a bus 309. It is to be noted that the client apparatus 101, the relay server 104, and the service server 106 can be a virtual computer realized on another computer.

Figure 4:
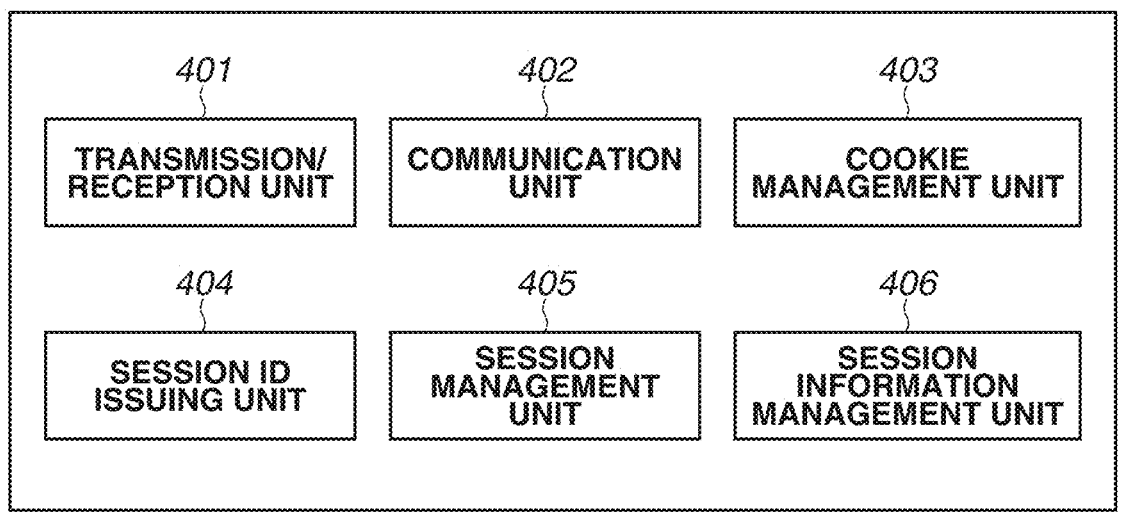
FIG. 4 is a block diagram illustrating a functional configuration of the relay server.

A functional configuration will now be described of the relay server 104 realized by activation of the browse application 105. FIG. 4 is an explanatory diagram illustrating a functional configuration of the relay server 104 in a case where the browse application 105 is activated. The relay server 104 includes the following functional configuration by the browse application 105. The relay server 104 includes a transmission/reception unit 401. The transmission/reception unit 401 generates webpages to be transmitted to the web browser of the client terminal, and transmits and receives various types of information including the webpages to the web browser of the client apparatus 101. The relay server 104 also includes a communication unit 402 and a cookie management unit 403. The communication unit 402 communicates with the service server 106. The cookie management unit 403 writes, reads, and deletes cookies of the web browser of the client apparatus 101. The cookie management unit 403 can encrypt and decrypt values in writing and reading cookies. The relay server 104 further includes a session ID issuing unit 404, a session management unit 405, and a session information management unit 406. The session ID issuing unit 404 issues a session identifier (hereinafter, referred to as "session ID") for uniquely identifying a session that is started in a case where the relay server 104 is accessed for the first time after the web browser of the client terminal is activated. The session management unit 405 checks whether the session ID to be transmitted to the relay server 104 is valid in writing, reading, and deleting the session ID to or from a temporary area of the web browser of the client terminal or in accessing the relay server 104 by the web browser of the client terminal. The session information management unit 406 manages information in association with the session ID. According to the present exemplary embodiment, the session management unit 405 manages the session ID based on cookies of the web browser of the client terminal using the cookie management unit 403.

First, processes in a case where the MFP 102 executes printing or scanning will now be described.

Figure 5:
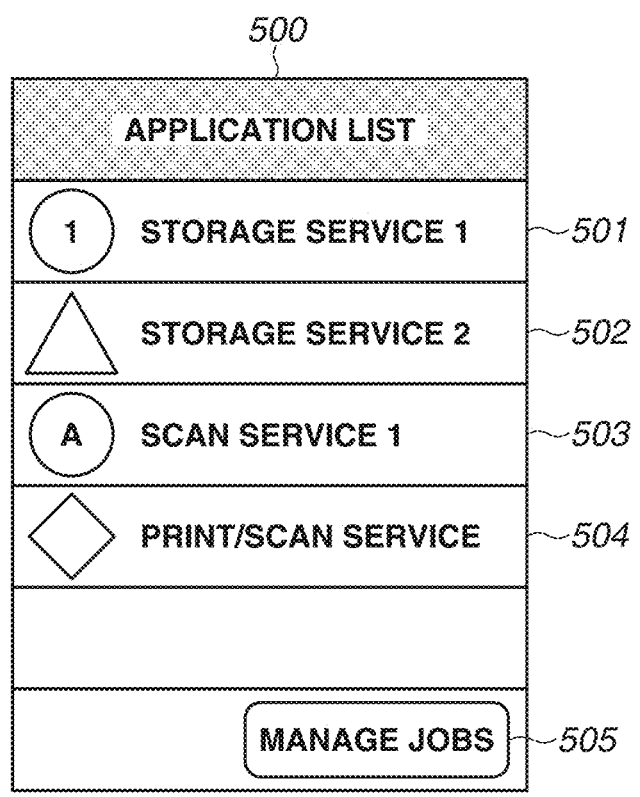
FIG. 5 illustrates an example of an application list screen.

FIG. 5 illustrate an example of a screen of an application list 500 that is displayed on the display unit 305 or 208 in a case where the web browser of the client apparatus 101 or the web browser of the MFP 102 accesses the browse application 105 of the relay server 104. The application list 500 displays four types of service names 501, 502, 503, and 504 as options. The displayed service names 501, 502, 503, and 504 each indicate its corresponding service provided by the service server 106. A plurality of services (e.g., service names 501 and 503) can be realized by the same service server or can be provided by a different service server from each other. Alternatively, a single server can include the functions of the relay server 104 and the service server 106 for some or all of the services. Each mark at the left side of a service name represents an icon from which the service name can be identified as an image. When a MANAGE JOBS button 505 is pressed, a job management screen for checking incomplete jobs and executed jobs is displayed.

In coordination with the services, the relay server 104 realizes an application function of printing documents or images acquired from the services using the MFP 102 or transmitting documents or images scanned by the MFP 102 to the services. Possible printing applications are an application that prints documents or images stored on the service server 106 providing storage services and image sharing services and a print job execution application that displays and executes print jobs managed in the service server 106. Further, possible scanning applications are a storage application and a profile execution application. The storage application stores scanning results on the service server 106 providing storage services. The profile execution application processes scanning results based on processing methods registered in the service server 106. Each application can include both print and scan functions or can be configured to execute only one of the print and scan functions.

On the application list 500, only the applications that can be used by the user with the MFP 102 are desirably selectable. For example, a scan service 1 (503) is controlled to be disabled or hidden in a case where the user is prohibited to use the scan function of the MFP 102 or the MFP 102 includes no scan function.

Figure 6:
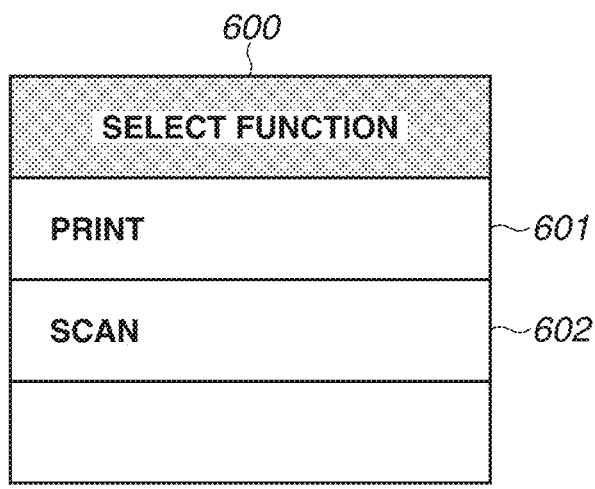
FIG. 6 illustrates an example of a function selection screen after an application is activated.

In a case where an application that provides services corresponding to both print and scan functions is selected, a screen that prompts the user to further select a function to use can be displayed as illustrated in FIG. 6 after the application is selected so that the user can use the selected function. In this case, only the functions that can be used are desirably controlled to be selectable as in the application list 500 described above. For example, in a case where the user is prohibited to use the scan function of the MFP 102 or the MFP 102 includes no scan function, a scan menu 602 is controlled to be disabled or hidden. In a case where the scan menu 602 is hidden, only a print menu 601 is selectable.

Thus, the display of a function selection screen 600 can be skipped, and a screen in a state after the print menu 601 is selected can be displayed.

Figure 7:
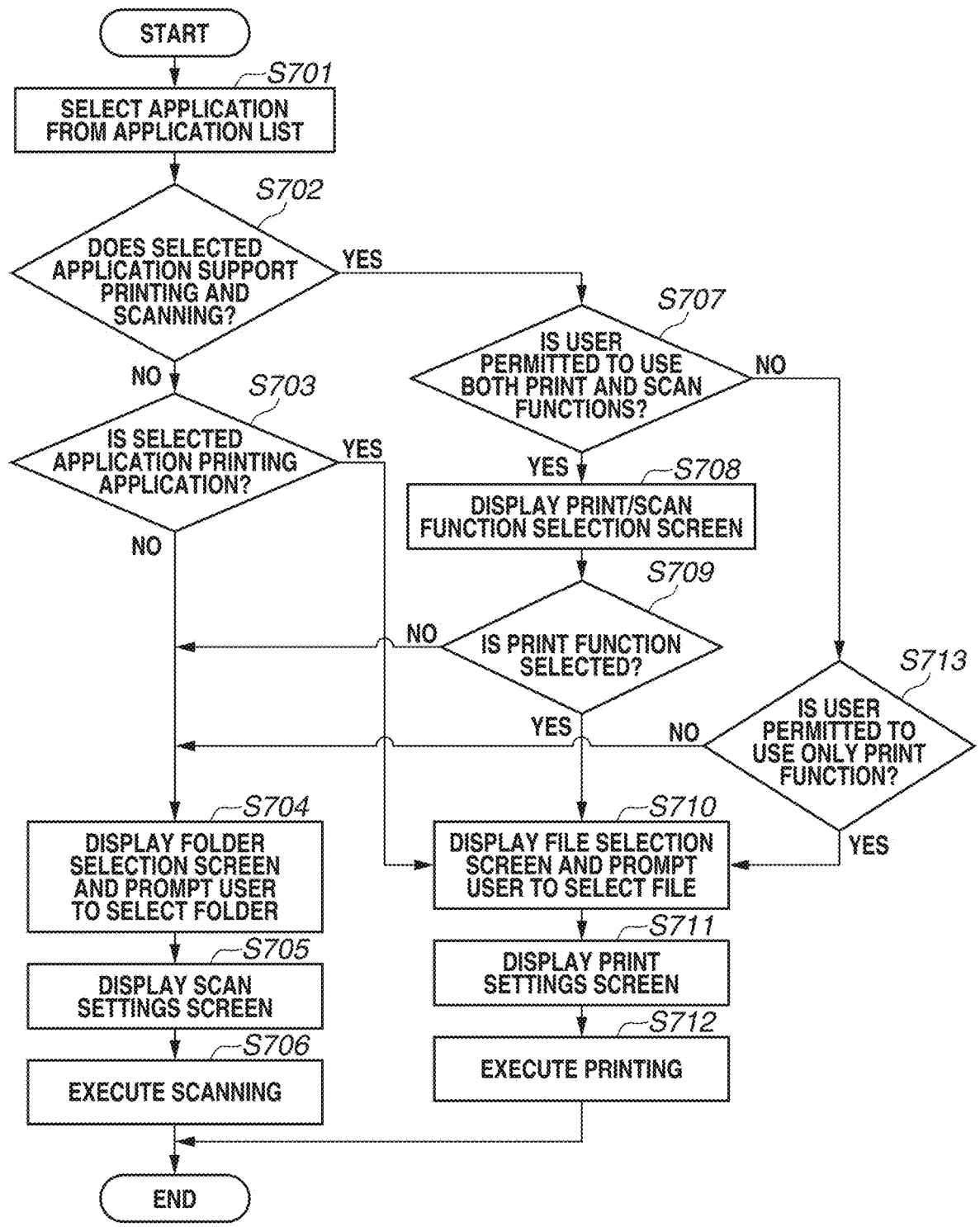
FIG. 7 is a flowchart illustrating a branch determination process for a screen display after an application is activated.

FIG. 7 illustrates a branch determination process that is executed by the browse application 105 of the relay server 104 after the application list 500 is displayed.

In step S701, if selection of an application by a user operation on the application list 500 via the operation unit 306 or 209 is received, information indicating the selected application is transmitted from the client terminal to the browse application 105 of the relay server 104.

In step S702, the browse application 105 determines whether the selected application is an application that supports both printing and scanning. In a case where the selected application is an application that supports both printing and scanning (YES in step S702), the processing proceeds to step S707, whereas in a case where the selected application is an application that supports only one of printing and scanning (NO in step S702), the processing proceeds to step S703. In step S703, the browse application 105 determines whether the selected application is a printing application. In a case where the selected application is a printing application (YES in step S703), the processing proceeds to step S710, whereas in a case where the selected application is not a scanning application (NO in step S703), the processing proceeds to step S704.

Steps S704 to S706 are a processing flow up to execution of scanning. Specifically, in step S704, the browse application 105 generates a folder selection screen based on the services provided by the service server 106, transmits information about the generated folder selection screen to the MFP 102, and displays the folder selection screen on the web browser of the MFP 102 to prompt the user to select a folder. Thereafter, in step S705, the browse application 105 generates a scan settings screen, transmits the generated scan settings screen to the MFP 102, and displays the scan settings screen on the web browser of the MFP 102 to prompt the user to configure scan settings. In step S706, in a case where a scan execution instruction is issued, a scan instruction is transmitted together with information about the transmission destination folder and the scan settings to the local application of the MFP 102. Consequently, the MFP 102 executes scan processing. In the above-described example, a folder is selected in step S704. In a case of a service that executes scan data based on a preset profile, however, the user is prompted to select a scan profile to determine a storage destination in step S704.

Steps S710 to S712 are a processing flow up to execution of printing. In step S710, the browse application 105 generates a file selection screen based on the services provided by the service server 106, transmits information about the generated file selection screen to the MFP 102, and displays the file selection screen on the web browser of the MFP 102 to prompt the user to select a print file. In step S711, the browse application 105 generates a print settings screen, transmits the generated print settings screen to the MFP 102, and causes the MFP 102 to display the print settings screen on the web browser of the MFP 102 to prompt the user to configure print settings. In step S712, if a print execution instruction is issued, a print instruction is transmitted together with information about the selected file and information about the print settings, to the local application of the MFP 102. The MFP 102 thereby executes print processing.

In a case where the selected application is an application that includes both print and scan functions (YES in step S702), the processing proceeds to step S707. In step S707, it is determined whether the user is being permitted to use both print and scan functions. This determination is performed using, for example, information about whether the MFP 102 being used includes both print and scan functions, or information about whether the user as an account of the service server 106 is permitted to use both print and scan functions. Whether to permit the user to use both print and scan functions can be preset by an administrator of the account. In a case where the user is permitted to use only one of the functions (NO in step S707), the processing proceeds to step S713. In step S713, whether the user is permitted to use the print function or the scan function is determined. In a case where the user is permitted to use only the print function (YES in step S713), the processing flow of printing from step S710 described above is executed. Whereas in a case where the user is permitted to use only the scan function (NO in step S713), the processing flow of scanning from step S704 described above is executed. In contrast, in step S707, in a case where the user is determined as being permitted to use both print and scan functions (YES in step S707), the processing proceeds to step S708. In step S708, the print/scan function selection screen illustrated in FIG. 6 is displayed to prompt the user to select a desired function. In a case where it is determined that the print function is selected (YES in step S709), the processing flow of printing from step S710 described above is executed, whereas in a case where it is determined that the scan function is selected (NO in step S709), the processing flow of scanning from step S704 described above is executed.

Figure 8:
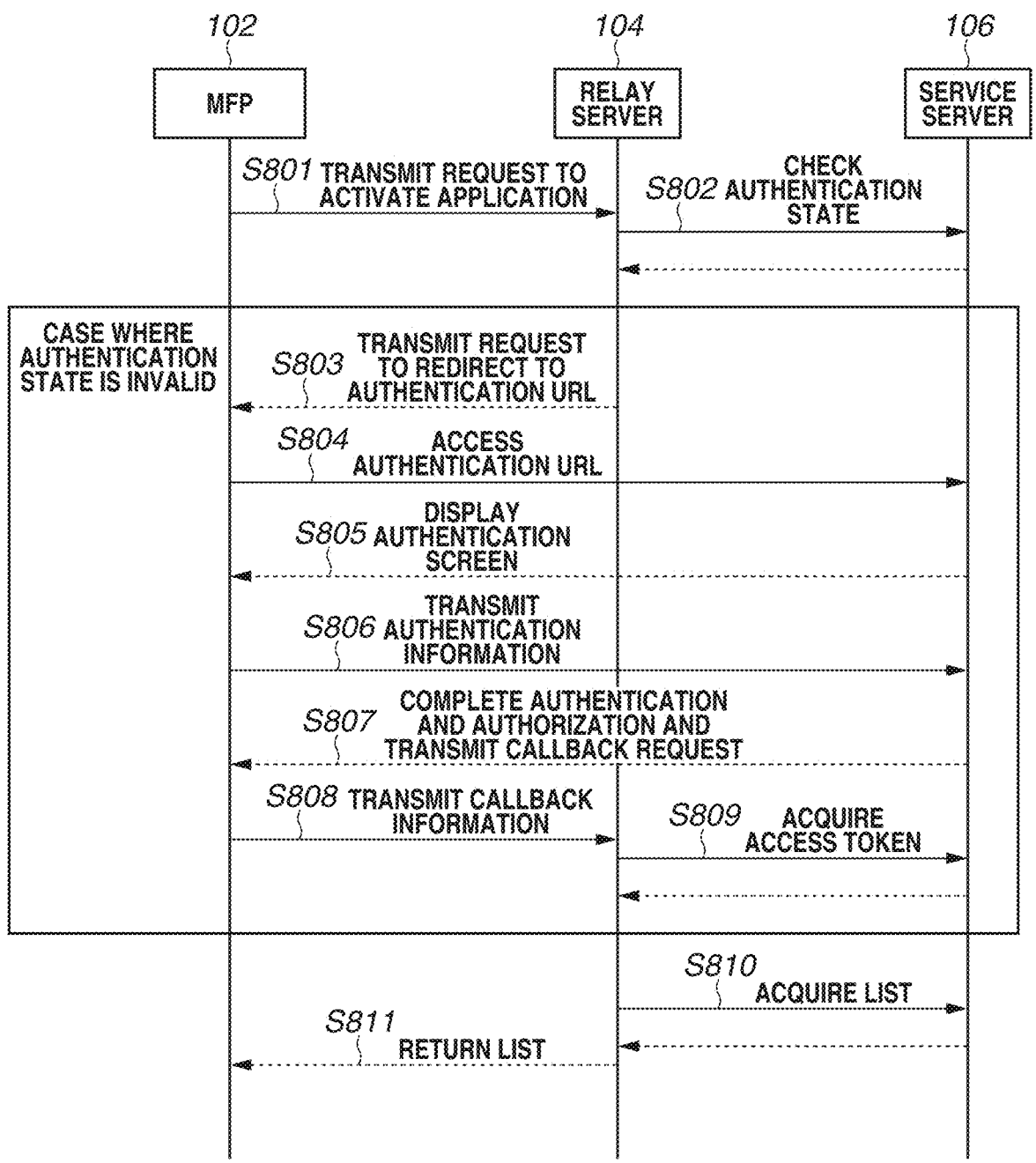
FIG. 8 is a sequence diagram illustrating a sequence of performing user authentication and authorization to acquire data of the service server.

FIG. 8 illustrates a sequence diagram from the user authentication and authorization to the display of a screen for selecting a list of folders of the user or a list of print jobs in a case where the web services of both the service server 106 and the relay server 104 coordinate together and realize file acquisition and uploading processing. In here, commonly-known OAuth will be described as an example. In OAuth, the relay server 104 plays a role of a client, and the service server 106 plays a role of a resource server. While a case is described herein where the user uses the browse application 105 of the relay server 104 using the display unit 208 and the operation unit 209 of the MFP 102, similar processing and operations are executed also in a case where the user uses the client apparatus 101.

When, in step S801, an application is selected from the application list 500 via the operation unit 209 of the MFP 102, the MFP 102 transmits a request to activate the selected application to the relay server 104. In step S802, the relay server 104 then checks an authentication state stored on the service server 106.

In a case where, in step S802, the service server 106 determines that the authentication state is invalid, the relay server 104 transmits, in step S803 to the MFP 102, a redirect request to redirect to a uniform resource locator (URL) for authentication by the service server 106. This corresponds to a case where authentication information in the previous authentication has been expired or a case where the MFP 102 is attempting to access the service server 106 for the first time.

In step S804, the MFP 102 accesses the URL for authentication by the service server 106 based on the received redirect request. In step S805, the MFP 102 displays an authentication screen on the display unit 208 of the MFP 102.

The MFP 102 acquires information (e.g., account ID, password) for authentication from the user via the authentication screen, and transmits, in step S806, the received information to the service server 106. In step S807, the service server 106 thereby transmits a callback request after completion of authentication to the MFP 102.

In response to the callback request, the MFP 102 transmits, in step S808, callback information to the relay server 104. In a case where the authenticated user has not completed authorization processing for using the functions provided by the service server 106, the processing flow of steps S805 and S806 is executed again to redirect to an authorization screen, to display a permission screen to acquire permissions for necessary items from the user, and to transmit information about the permissions from the user to the service server 106.

In a case where the authentication screen displayed in step S805 is in a form that cannot be displayed on the display unit 208 of the MFP 102, the authentication and authorization operations in steps S805 to S807 can be executed on another terminal, such as the client apparatus 101.

Figure 9:
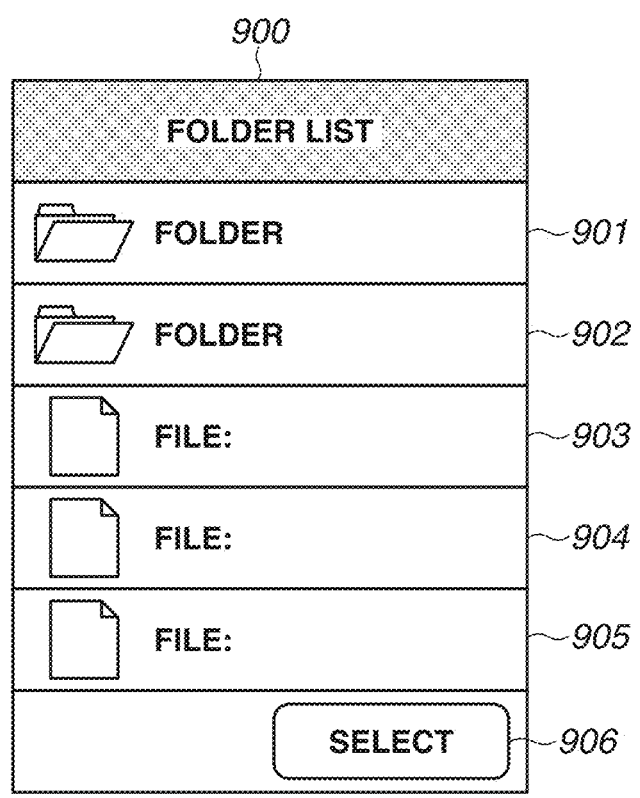
FIG. 9 illustrates an example of a folder list screen.

When the authentication and authorization operations are completed normally and the relay server 104 receives the callback information, the relay server 104 acquires, in step S809, necessary access tokens for acquiring authenticated account information from the service server 106 based on the received callback information. In step S810, the relay server 104 acquires, using the acquired access tokens, folder information and a print job list of the service server 106 associated with the authenticated account. In step S811, the relay server 104 returns the received list to the MFP 102 and generates a folder/file display screen or a print job display screen on the display unit 208 of the MFP 102. FIG. 9 illustrates an example of a folder/file display screen.

In FIG. 9, folders 901 and 902 indicate folders of the user on the service server 106. Files 903, 904, and 905 indicate files that are on the same hierarchical layer as the folders 901 and 902.

When a scanning application is executed or a scan function of an application capable of printing and scanning is executed, the user is prompted to select a scanning result uploading destination folder by operating the operation unit 209. In this case, the file 903, the file 904, and the file 905 are not selectable. Alternatively, the files that cannot be selected can be hidden.

When any one of the folders 901 and 902 is selected, the MFP 102 transmits information about the selected folder to the relay server 104. Consequently, steps S810 and S811 are executed again, and a folder/file display screen 900 is updated to display sub-folders and files stored in the selected folder. If a SELECT button 906 is pushed, any folder that is displayed at the time of the selection is selected as an uploading destination folder. In the state illustrated in FIG. 9, the folder including the folders 901 and 902 and the files 903 to 905 is selected.

When a printing application is executed or a print function of an application capable of printing and scanning is executed, the user is prompted to select a printing target file by operating the operation unit 209. Even at this time, sub-folders and files stored in the selected folder are displayed as in executing the scan function described above in a case where a folder 901 or a folder 902 is selected. In executing the print function, a file to be printed needs to be identified. Thus, the SELECT button 906 is enabled only in a state where a file is being selected.

Figure 10:
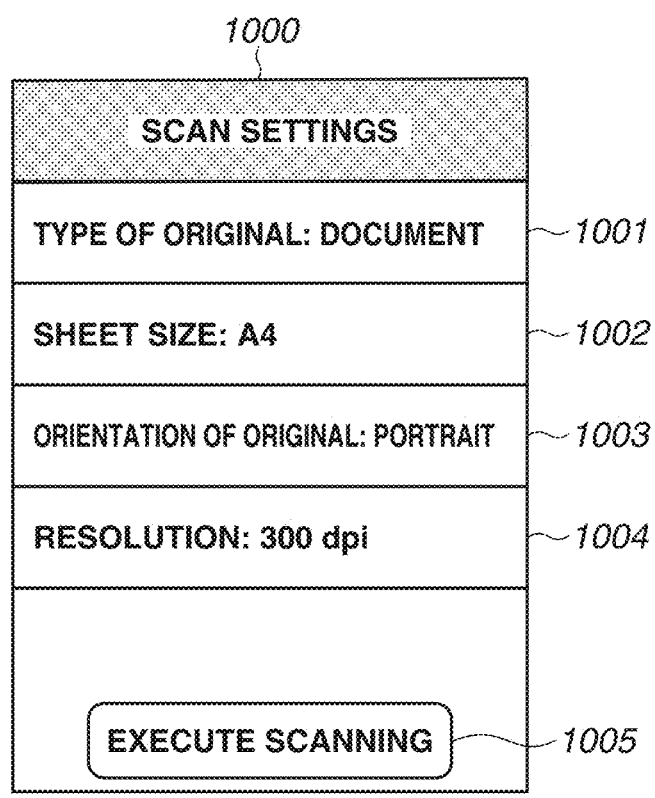
FIG. 10 illustrates an example of a scan settings screen.

FIG. 10 illustrates an example of a screen for configuring the scan settings after the SELECT button 906 is pushed in executing the scan function. Possible items of settings that can be changed are typically a type of an original 1001, a sheet size 1002, an orientation of the original 1003, and a resolution 1004. However, any item that is settable for the MFP 102 can be set, or all items can be predetermined and nothing is to be set in executing scanning.

Figure 11:
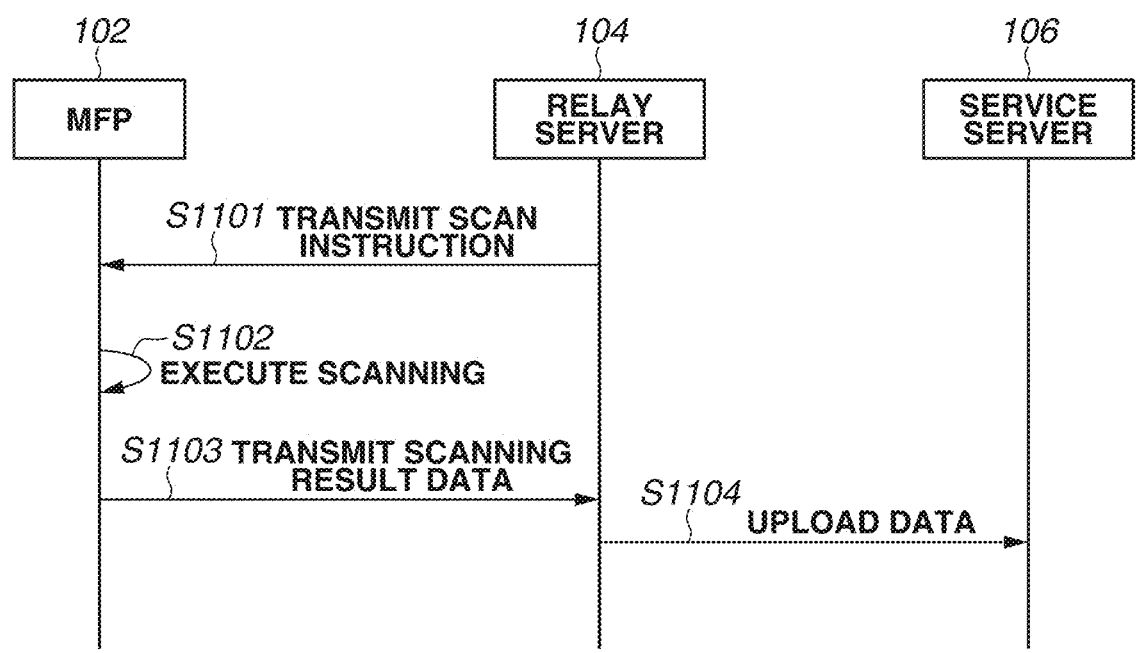
FIG. 11 is a sequence diagram illustrating a process of uploading scan data.

When an EXECUTE SCANNING button 1005 is selected, the MFP 102 transmits a notification indicating that the EXECUTE SCANNING button 1005 is selected to the relay server 104. Consequently, a scan data uploading process illustrated in FIG. 11 is started.

In step S1101, the relay server 104 transmits a scan instruction to the MFP 102 using parameters of the scan settings configured by the user via a scan settings screen 1000.

The scan instruction can include other parameters (e.g., UI display form information) specifying behaviors in a case where the MFP 102 executes the scan job together with the parameters of the scan settings. FIG. 12 illustrate an example of parameters 1200 (hereinafter, referred to as "scan parameters") transmitted from the relay server 104 to the MFP 102 in transmitting the scan instruction (step S1101). In the example of the scan parameters, the parameters of the scan settings described above (tickets 1206) and other parameters including a job ID 1201, a job type 1202, a job name 1203, an application ID 1204 of the application by which the job has been input, and job input date and time 1205 are described.

In step S1102, the MFP 102 having received the scan instruction executes scanning based on the designated parameters of the scan settings. In step S1103, the MFP 102 transmits scanning result data to the relay server 104. While the scanning is being executed (step S1102), a screen indicating that scanning is being executed can be displayed on the display unit 208. Furthermore, in a case where the parameters specifying behaviors are received from the relay server 104, behaviors (e.g., display form) of the display unit 208 can be changed based on the parameters. In step S1104, the relay server 104 uploads binary data on the received scanning result to the service server 106, which is a storage server associated with the account, using the access tokens acquired in step S809 in FIG. 8. The folder information selected by the user via the folder/file display screen 900 in FIG. 9 is also transmitted, and an instruction to store the uploaded scan data in the folder selected by the user is issued.

Figure 13:
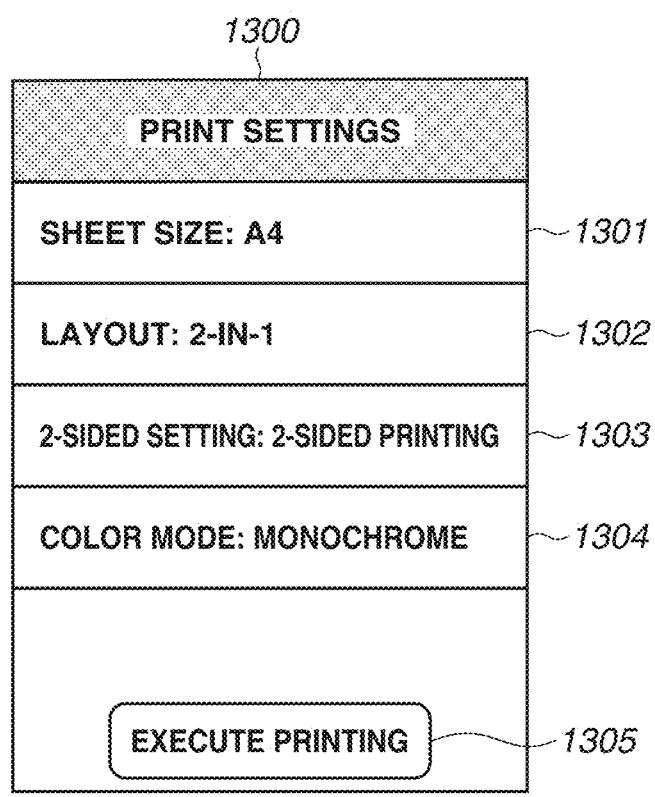
FIG. 13 illustrates an example of a print settings screen.

FIG. 13 illustrate an example of a screen for configuring the print settings after the SELECT button 906 is selected in executing the print function. While possible items of settings that can be set are typically a sheet size 1301, a print layout 1302, a 2-sided setting 1303, and a color mode 1304, any items that are settable for the MFP 102 can be set. Alternatively, all items can be predetermined and nothing is to be set in executing printing.

Figure 14:
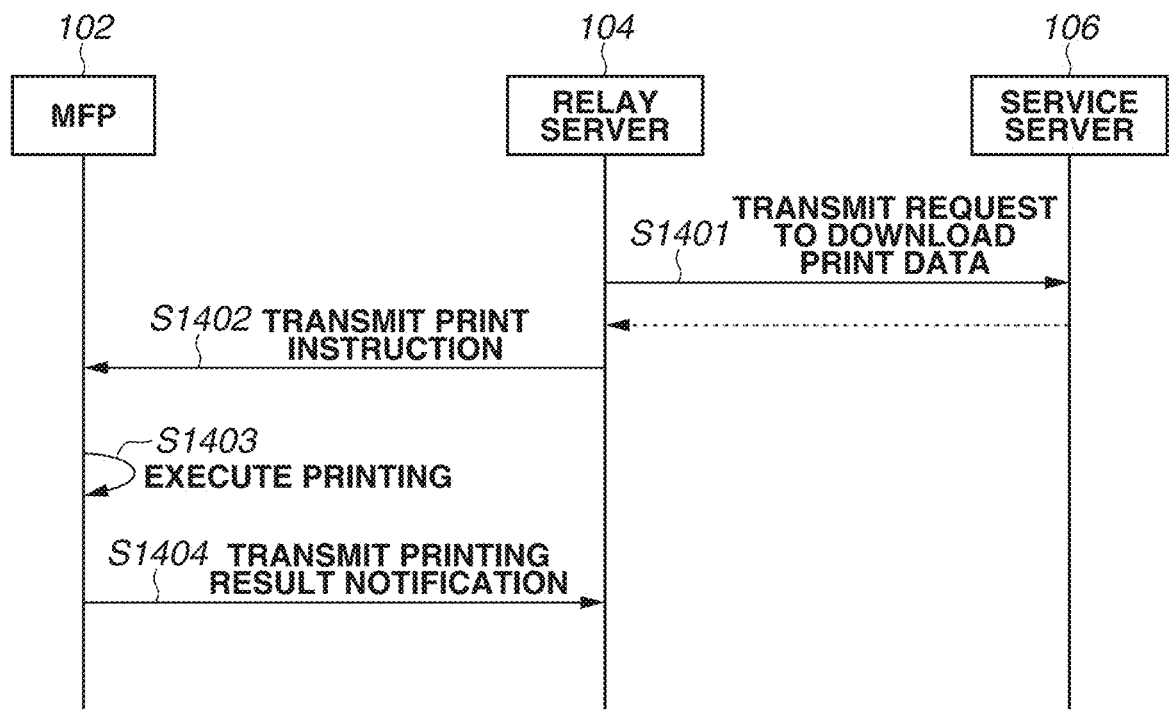
FIG. 14 is a sequence diagram illustrating a printing process.

When an EXECUTE PRINTING button 1305 is pushed, the MFP 102 transmits a notification of information indicating that the EXECUTE PRINTING button 1305 has been pushed to the relay server 104. Consequently, a printing process illustrated in FIG. 14 is started.

In step S1401, the relay server 104 transmits a request to download print data for executing printing to the service server 106. In step S1402, when the download of the print data is completed, the relay server 104 transmits, to the MFP 102, a print instruction to execute printing using the parameters of the print settings configured via a print settings screen 1300 and the print data downloaded in step S1401. The print instruction can include, together with the parameters of the print settings, parameters (e.g., UI display form information) specifying behaviors in a case where the MFP 102 executes the print job.

In step S1403, the MFP 102 having received the print instruction executes printing based on the designated parameters of the print settings. While the printing is being executed (step S1403), a screen indicating that printing is being executed can be displayed on the display unit 208. Furthermore, in a case where the parameters specifying behaviors are received from the relay server 104, behaviors (e.g., display form) of the display unit 208 can be changed based on the parameters. In step S1404, after completing the printing, the MFP 102 transmits, to the relay server 104, a printing result indicating that the printing has been completed successfully, a printing result indicating that an error has occurred, or a printing result indicating that the printing has been cancelled by the user. The printing result notification can include information from which the consumption of consumables can be estimated, such as information about the number of pages printed on sheets that are used, information indicating which one of color printing and monochrome printing is executed, and information indicating whether 2-sided printing is executed. In a case where the printing is cancelled by the user while the printing is being executed, information about the executed part of the printing is transmitted to the relay server 104.

Hereinafter, the following items will be described: a method for providing a screen to be displayed on the client terminal and an example of changing a display form of the screen according to the present exemplary embodiment, and a method for providing a screen to be displayed in executing a job by the local application of the MFP 102 and an example of changing a display form of the screen.

First, a method for determining a display mode, a method for providing a screen to be displayed on the client terminal, and an example of changing a display form will now be described with reference to FIGS. 15 to 19.

FIG. 15 illustrates an example of a data structure for managing display modes that can be displayed by the browse application 105 for each service application. The data structure presents display modes that can be displayed by each application in tabular form. There may be a case where the number of display modes that can be displayed by an application is zero, one, or more. In a case where the number of display modes that can be displayed is more than one, the display modes can be prioritized. For example, FIG. 15 indicates that a scan service 1 can be displayed in two display modes that are a work mode and a study mode. While the tabular form is used in the example, any form of data structure can be used as long as the data structure can determine a displayable display mode if an application is given. A service without a displayable display mode is to be displayed in a default display form, and the changing of display form is not executed.

Figure 16:
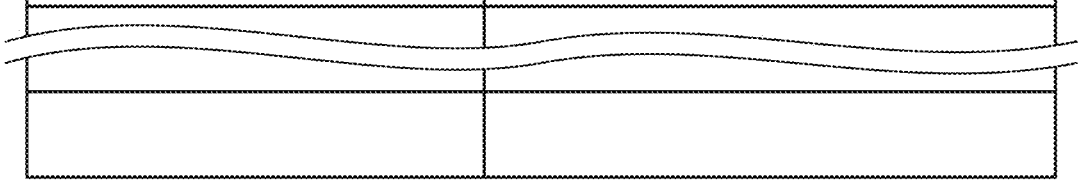
FIG. 16 is a diagram illustrating display modes displayed for each model.

FIG. 16 illustrates an example of a data structure for managing display modes that can be displayed by the MFP 102 for each model identification ID. Each model identification ID is an ID determined uniquely for each MFP. There may be a case where the number of display modes that can be displayed by a model is zero, one, or more. In a case where the number of display modes that can be displayed is more than one, the display modes can be prioritized. For example, FIG. 16 indicates that a model A can be displayed in the display mode "work mode". While the tabular form is used in the example, any form can be used of data structure that determines a displayable display mode if a model identification ID is given.

Figure 17:
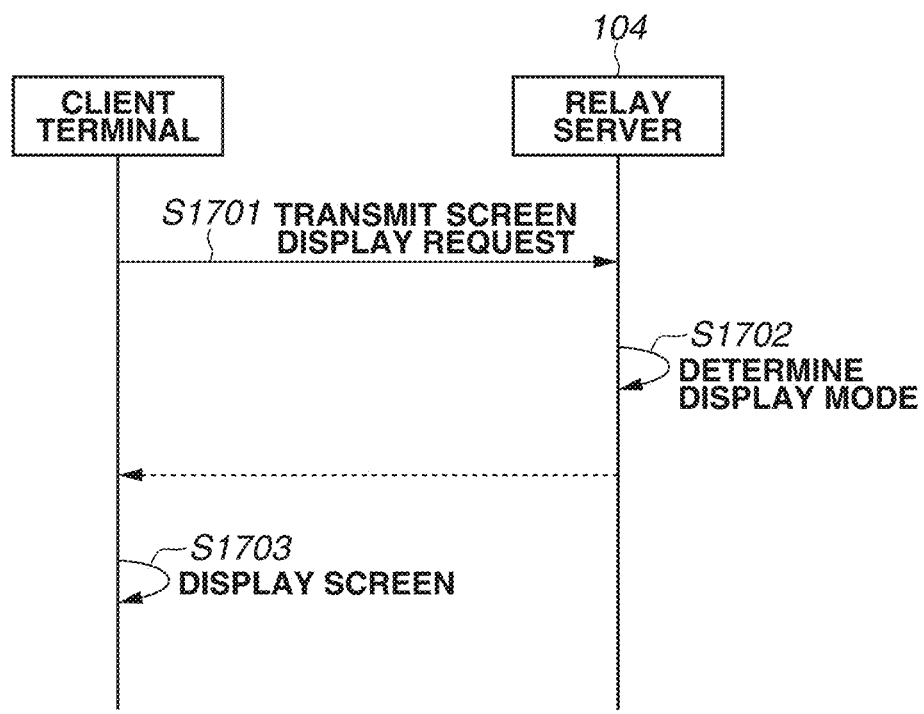
FIG. 17 is a sequence diagram illustrating a processing flow of displaying a screen including a display mode determination process.

FIG. 17 illustrates a sequence diagram in which a screen display request is issued by the web browser of the client terminal, a screen display mode to be provided is determined by the relay server 104 having received the screen display request, and a screen is provided to the web browser of the client terminal. In step S1701, the client terminal transmits a screen display request to the relay server 104. When the relay server 104 receives the screen display request from the client terminal, the relay server 104 determines a screen to be provided to the client terminal based on the branch determination process illustrated in FIG. 7 and generates screen configuration information for displaying the screen on the web browser of the client terminal. The screen configuration information described herein indicates information that defines behaviors of the web browser and includes, for example, HyperText Markup Language (HTML), Cascading Style Sheets (CSS), and URLs for acquiring HTML or CSS. In step S1702, the relay server 104 determines a display mode based on a display mode determination process described below. There may be a case where there is no display mode as a result of the display mode determination process. In a case where a display mode is determined in step S1702, screen configuration information with a screen display form changed based on the determined display mode is returned to the client terminal. Which part of the screen display form is to be changed and details of the change to be made can be defined for each display mode. For example, completely different display forms can be defined for the work mode and the study mode, or different display forms that are partially the same can be defined for the work mode and the study mode. In a case where there is no display mode, screen configuration information is returned to the client terminal without changing the display form. In step S1703, when the client terminal receives the screen configuration information from the relay server 104, the screen is displayed as a webpage on the web browser of the client terminal.

Figure 18:
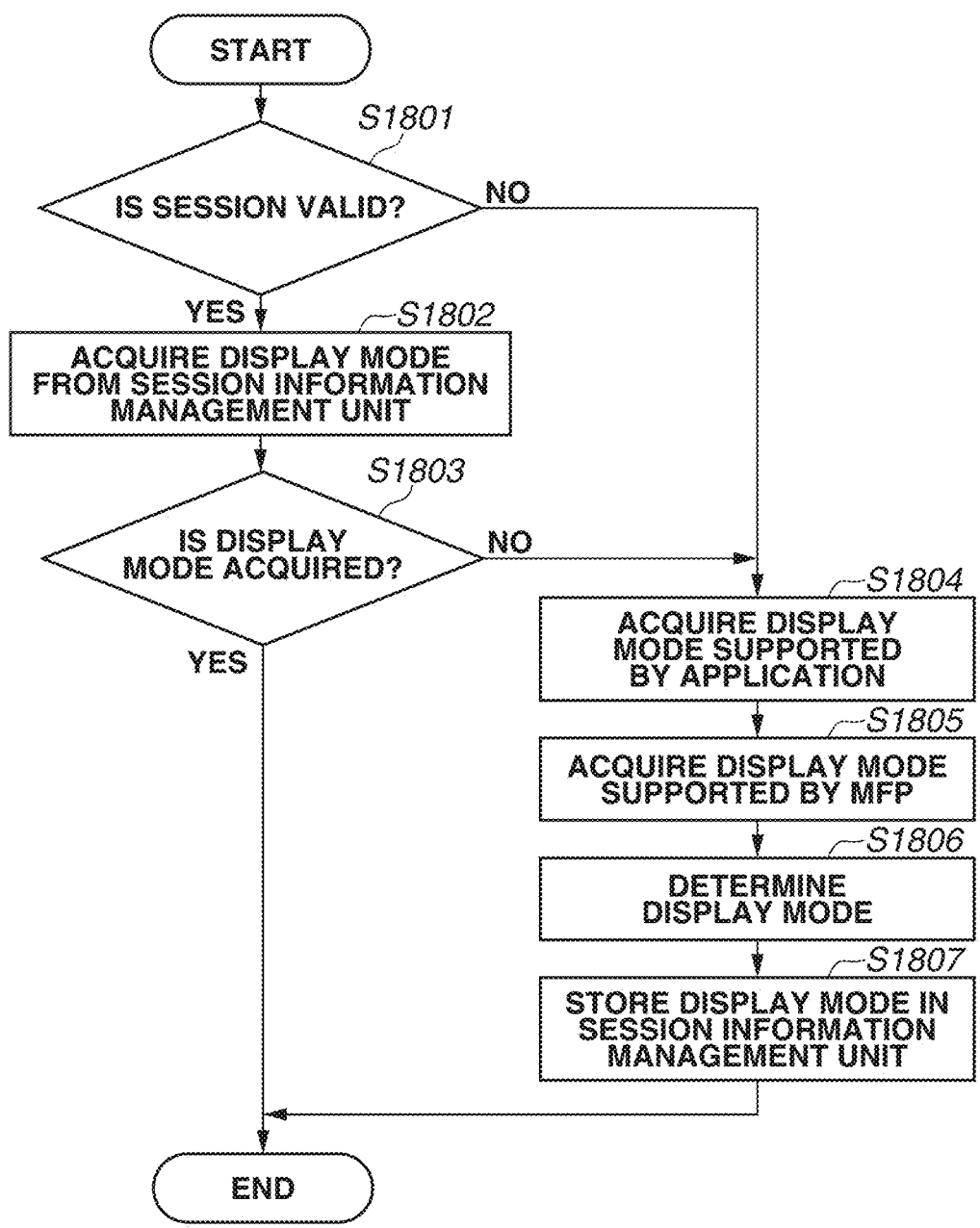
FIG. 18 is a flowchart illustrating a processing flow of the display mode determination process.

FIG. 18 illustrates the display mode determination process that is executed by the relay server 104 when a screen display request is transmitted from the web browser of the client terminal to the relay server 104. In the display mode determination process (steps S1804 to S1806) described below, there may be a case where setting information is read from the database 313 or acquired from an external server by communicating with the external server via the network 103. However, executing the foregoing processing each time the relay server 104 receives a screen display request from the client terminal may cause delays in responding to the screen display requests. Thus, a display mode acquired in advance is stored in the session information management unit 406 as session information between the web browser of the client terminal and the relay server 104, and the display mode is desirably acquired from the session information management unit 406 while the session between the web browser of the client terminal and the relay server 104 is valid.

When the relay server 104 receives a screen display request from the web browser of the client terminal, the relay server 104 acquires a display mode through the following determination process. In step S1801, the session management unit 405 first checks whether the session is valid based on a session ID transmitted from the web browser of the client terminal. If the session ID is valid (YES in step S1801), the processing proceeds to step S1802. In step S1802, the session management unit 405 attempts to acquire a display mode from the session information management unit 406. In step S1803, it is determined whether a display mode is successfully acquired from the session information management unit 406, whether information indicating that there is no display mode is acquired, or whether the attempt to acquire a display mode has failed. If a display mode is successfully acquired (YES in step S1803), the acquired display mode is determined, and the display mode determination process is ended. If information indicating that there is no display mode is acquired, it is determined that there is no display mode, and the display mode determination process is ended. In a case where there is no session ID or the session ID is invalid or in a case where the display mode acquisition from the session information management unit 406 has failed due to expiration of the session, a display mode is determined by the following process. In step S1804, the relay server 104 acquires display modes supported by the browse application 105 having issued the screen display request. At this time, the relay server 104 acquires display modes supported by the browse application 105 using data having the data structure illustrated in FIG. 15. In step S1805, the relay server 104 then acquires display modes supported by the MFP 102. At this time, the relay server 104 acquires display modes supported by the MFP 102 using data having the data structure illustrated in FIG. 16. In the display mode acquisition in steps S1804 and S1805, display modes can be acquired from the application program 312 or the database 313 or from an external server via the network 103. In step S1806, a display mode is determined by calculating a logical product of the display modes that can be displayed by the selected browse application 105 for the services and the display modes that can be displayed by the MFP 102. As illustrated in FIGS. 15 and 16, there is a plurality of display modes that the browse application 105 supports for each service and a plurality of display modes that the MFP 102 supports. Thus there may be a case where a display mode cannot be determined uniquely. In this case, a display mode is determined based on a predetermined priority order. For example, in a case where there is a plurality of display modes that can be displayed by the browse application 105, and the plurality of display modes is prioritized, a display mode can be determined based on the set priority order. In a case where there is a plurality of display modes that can be displayed by the MFP 102 and the plurality of display modes is prioritized, a display mode can be determined based on the set priority order, or the priority order can be written to a program of the application 214 or a program of the browse application 105. In a case where a display mode is determined as a result of step S1806, in step S1807, the determined display mode is written to the session information management unit 406. In a case where there is no display mode as a result of step S1806, in step S1807, information indicating that there is no display mode is written to the session information management unit 406.

Figure 19:
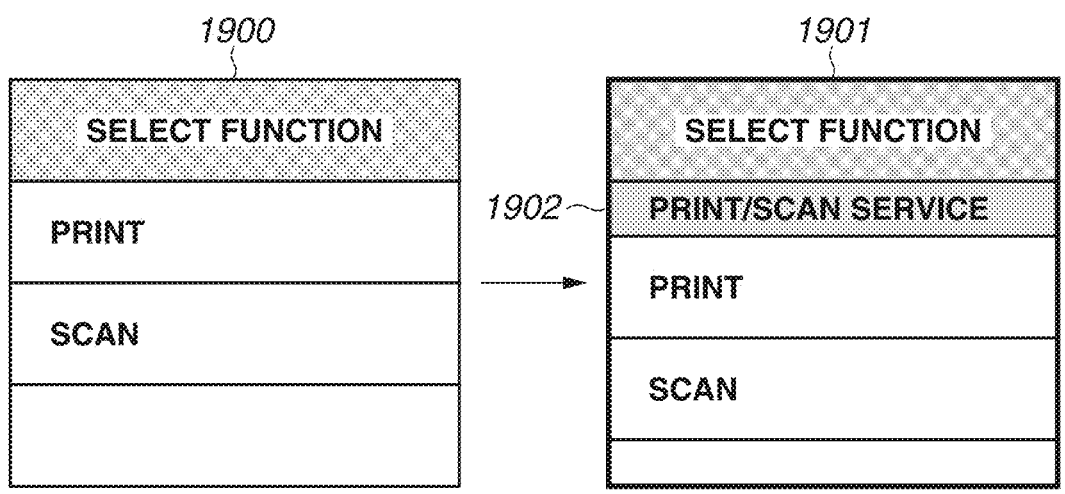
FIG. 19 illustrates an example of a change of a screen display form of a function selection screen.

FIG. 19 illustrates an example of a change of a display form of the print/scan function selection screen 600 in FIG. 6 that the relay server 104 provides to the client terminal. A screen 1901 is an example of a screen as a result of changing a display form of a function selection screen 1900, which is a screen before the display form is changed, based on the display mode determined by the display mode determination process described above. At this time, the display form is changed by increasing the thickness of an outer frame of the function selection screen from a normal thickness, changing the color of the outer frame, and displaying an application name 1902 on the screen (i.e., displaying characters that are not displayed on the function selection screen 1900 on the screen), as an example of changing the display form based on the display mode. However, any display form changing method can be used as long as the display form changing method provides a UI from which the user can recognize that the display mode is different from a normal display mode.

Figure 20:
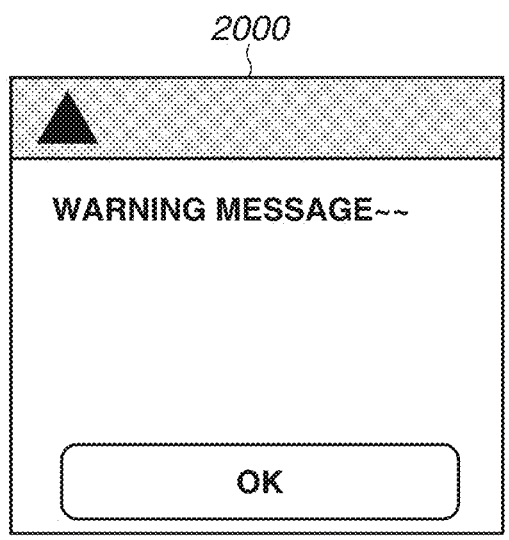
FIG. 20 illustrates an example of a dialog screen.

FIG. 20 illustrates an example of a dialog screen that is provided by the browse application 105 via the web browser of the MFP 102 and displayed on the display unit 208 in a case where an exceptional situation occurs or a message is to be checked by the user. An outer frame of a dialog screen 2000 is colored even in a case where the screen display form is not changed, and the color of the outer frame varies depending on how important the message is. If the change of the display form in the example illustrated in FIG. 19 is uniformly applied to the dialog screen 2000, the original intention to indicate the importance of the message to the user is no longer achieved. Thus, the change of the display form is not applied exceptionally. As described above, there may be screens that are not changed in display form for various reasons.

A method for providing a screen to be displayed by the local application of the MFP 102 during job execution and a method for changing a display form of a screen to be displayed on the display unit 208 according to the present exemplary embodiment will now be described. While a scan job and a print job will be described as examples of job types, any job can be used as long as the relay server 104 can provide operation instructions to the MFP 102 in the job. For example, a copy job or a job of turning on/off the MFP 102 can be used. Further, a method for changing a display form of a screen to be displayed by the local application of the MFP 102 during job execution will be described below starting from the press of a button for issuing a job execution instruction that is displayed on the client terminal (the MFP 102 or the client apparatus 101). However, any job input method can be used as long as jobs can be input to the MFP 102 via the relay server 104 by using the job input method. For example, a method can be used for changing a display form of a screen to be displayed by the local application of the MFP 102 during job execution by inputting a job to the MFP 102 via the relay server 104 starting from an automated process triggered by a screen operation on the service server 106 or by date and time.

Figure 21:
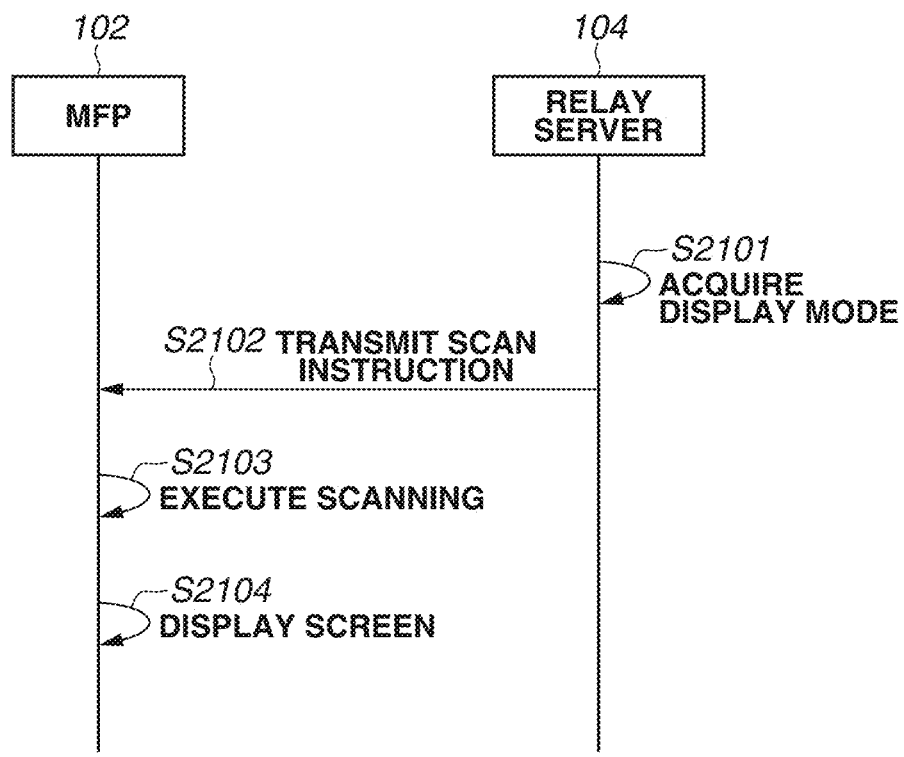
FIG. 21 is a flowchart illustrating a processing flow of changing a screen display form of a screen provided by a local application of the MFP in executing a scan job.

FIG. 21 illustrates a sequence diagram from the press of the EXECUTE SCANNING button 1005 to the display of the screen in the changed display form on the display unit 208 during execution of scanning. In step S2101, if the EXECUTE SCANNING button 1005 is pressed, the relay server 104 acquires a display mode based on the display mode determination conditions illustrated in FIG. 17. In step S2102, the relay server 104 transmits a scan instruction to the MFP 102. At this time, the display mode acquired in step S2101 is transmitted as part of scan parameter information transmitted to the MFP 102 in the scan instruction in step S2102. FIG. 22 illustrates an example of scan parameters transmitted to the MFP 102 in the scan instruction in step S2102.

Figure 23:
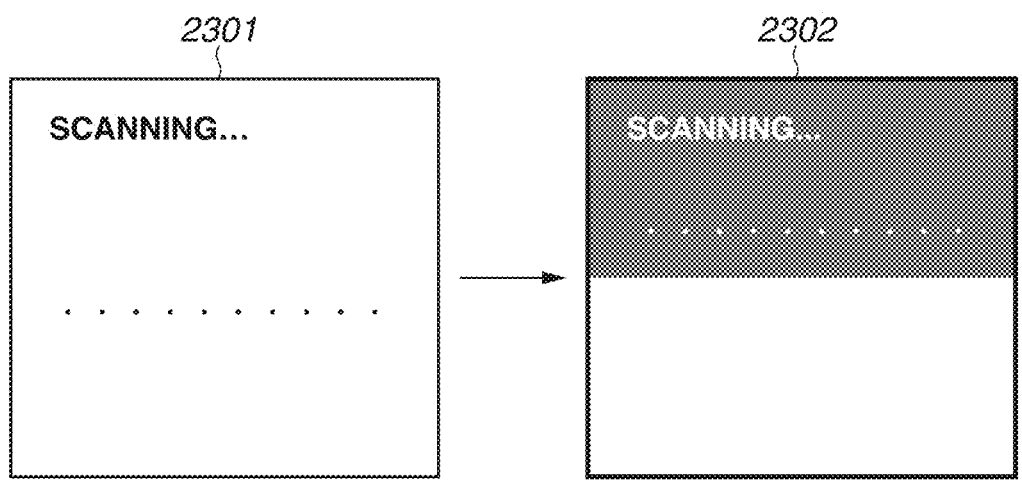
FIG. 23 illustrates an example of a screen provided by the local application of the MFP in executing a scan job.

Scan parameters 2200 include a display mode 2201 in addition to parameters described in the example of scan parameters illustrated in FIG. 12. While the form in which the display mode is transmitted as part of the job setting information in the scan instruction to the MFP 102 is described, any method by which the MFP 102 can acquire the display mode can be used. For example, the MFP 102 can request the display mode from the relay server 104 after receiving the scan instruction. In step S2103, if the MFP 102 receives the scan instruction, the MFP 102 executes a scan job. At this time, the MFP 102 changes, in step S2104, the display form of the UI to be displayed on the display unit 208 based on the display mode received from the relay server 104, and changes and displays the display form of the UI. FIG. 23 illustrates an example of a screen in a changed display form. A screen 2301 is an example of a screen in a display form that is not changed, whereas a screen 2302 is an example of a screen in a display form that is changed based on a display mode received from the relay server 104 by the MFP 102. For example, in a case where the display mode is the work mode, the screen 2302 is displayed in a form with a changed background color.

Figure 24:
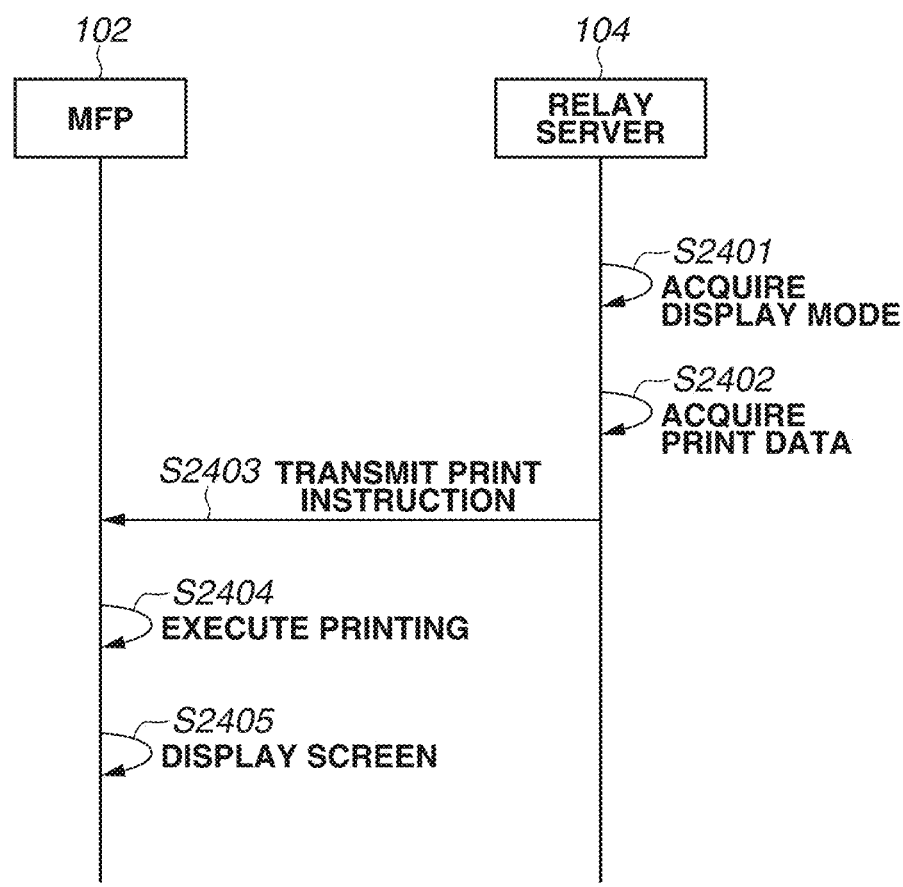
FIG. 24 is a flowchart illustrating a processing flow of changing a screen display form of a screen provided by the local application of the MFP in executing a print job.
Figure 25:
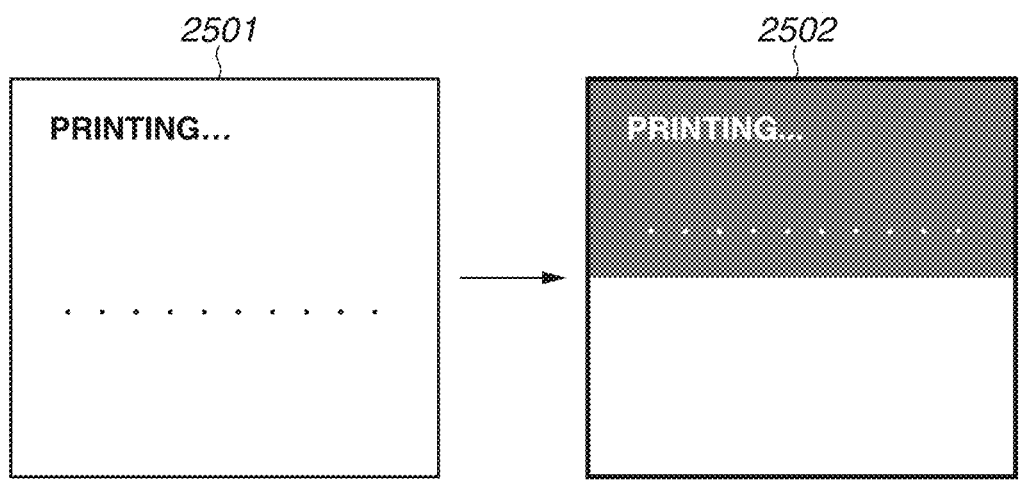
FIG. 25 illustrates an example of a screen provided by the local application of the MFP in executing a print job.

FIG. 24 illustrates a sequence diagram up to the display of a screen in a changed display form on the display unit 208 during execution of printing after the EXECUTE PRINTING button 1305 is pressed. In step S2401, if the EXECUTE PRINTING button 1305 is pressed, the relay server 104 acquires a display mode based on the display mode determination conditions illustrated in FIG. 17. In step S2402, the relay server 104 acquires print data. In step S2403, the relay server 104 then transmits a print instruction to the MFP 102. At this time, the relay server 104 transmits the display mode acquired in step S2401 as part of job setting information transmitted to the MFP 102 together with the print instruction. The form has been described in which the display mode is transmitted as part of the job setting information in the print instruction to the MFP 102. However, any method by which the MFP 102 can acquire the display mode can be used. For example, the MFP 102 can request the display mode from the relay server 104 after receiving the print instruction. In step S2404, if the MFP 102 receives the print instruction, the MFP 102 executes a print job. At this time, in step S2405, the MFP 102 changes and displays the display form of the UI to be displayed on the display unit 208 based on the display mode received from the relay server 104. FIG. 25 illustrates an example of a screen in a changed display form. A screen 2501 is an example of a screen in a display form that is not changed, whereas a screen 2502 is an example of a screen in a display form that is changed based on a display mode received from the relay server 104 by the MFP 102. For example, in a case where the display mode is the work mode, the screen 2502 is displayed in a form with a changed background color.

As described above, the local application of the MFP 102 displays a processing progress status on a normal screen, such as the screen 2301 in FIG. 23 or the screen 2501 in FIG. 25, in a case where the local application executes scanning or printing by operating a local UI on the MFP 102. On the contrary, in a case where a scan service or a print service provided by the service server 106 is used via a screen provided by the relay server 104, the local application of the MFP 102 displays a screen in a changed display form, such as the screen 2302 in FIG. 23 or the screen 2502 in FIG. 25. This makes it easy for the user of the MFP 102 to identify whether a job being processed by the MFP 102 is a job based on a service provided by the service server 106.

The foregoing description describes a method for changing a display form of a screen to be displayed on the web browser of the client terminal and a method for changing a display form of a screen provided by the local application during job execution according to the first exemplary embodiment. By adding a display mode as parameter information during job execution, a display form of a screen that displays a job execution status list and a display form of a screen that displays an executed job log information list can also be changed based on the display mode. A method for changing a display form of a job management screen according to a second exemplary embodiment will now be described.

Figure 26:
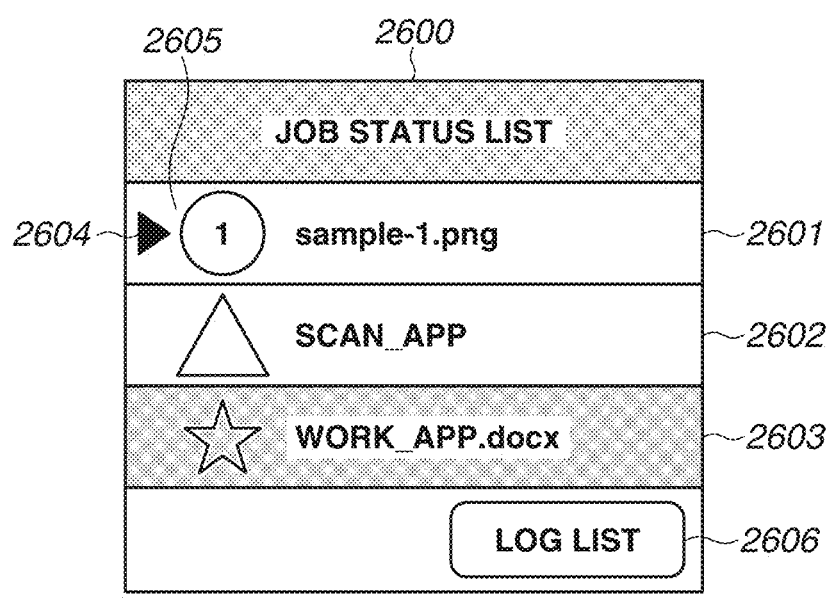
FIG. 26 illustrates an example of a screen that displays status of jobs being executed.
Figure 27:
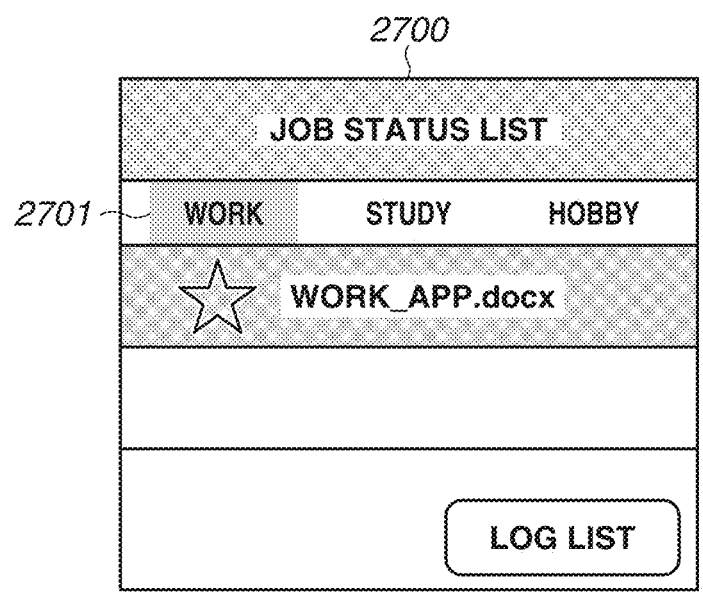
FIG. 27 illustrates an example of a display in a case where status of jobs being executed is displayed for each display mode.

FIG. 26 illustrates an example of a job status list screen displaying an incomplete job list. If the MANAGE JOBS button 505 is pressed, a job status list screen 2600 displaying a list of incomplete print jobs and incomplete scan jobs is displayed. While the incomplete jobs are displayed at the press of the MANAGE JOBS button 505 according to the present exemplary embodiment, any procedure for displaying the job status list screen 2600 can be used. Further, while the print jobs and the scan jobs are listed together, the print jobs can be displayed on a screen and the scan jobs can be displayed on another screen. While print jobs and scan jobs are described herein as an example, other jobs (e.g., copy job) can also be displayed. In a case where there are incomplete jobs, the incomplete jobs are listed on the job status list screen 2600. In the example illustrated in FIG. 26, three job names 2601, 2602, and 2603 are displayed on the job status list screen 2600. The job name 2601 is a print job. The job name 2602 is a scan job. The job name 2603 is a print job that is input in the work mode. Each job name can be given a name at the time of inputting the job, and a file name of a print file can be used for the print job name but does not have to be used. Further, job input date/time, a job execution state 2604, and an icon 2605 from which the browse application 105 having input the job can be identified as an image can be displayed together, or the display form can be changed based on the display mode transmitted as job setting information at the time of inputting the job. While a background of the job name 2603 is changed, any method can be used for changing the display form so that the user can recognize the display mode. For example, a color of characters of a job name can be changed. Furthermore, jobs can be grouped for each display mode and displayed by group as illustrated in FIG. 27. In the example in FIG. 27, a list of incomplete jobs that are jobs input in the work mode is displayed in a job status list screen 2700, and at the press of a display mode selection button 2701, the current screen changes to a screen that displays incomplete jobs of another display mode (e.g., study mode).

Figure 28:
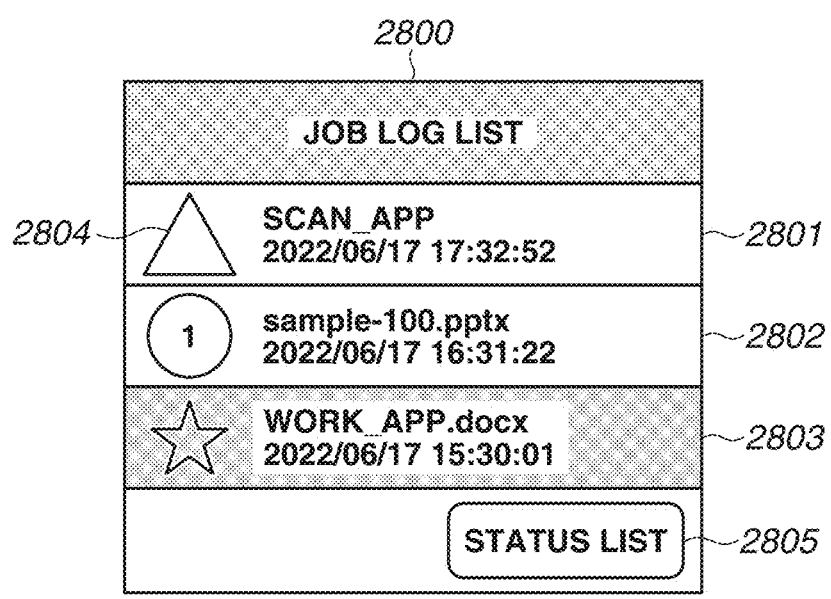
FIG. 28 illustrates a screen example for displaying a job log.
Figure 29:
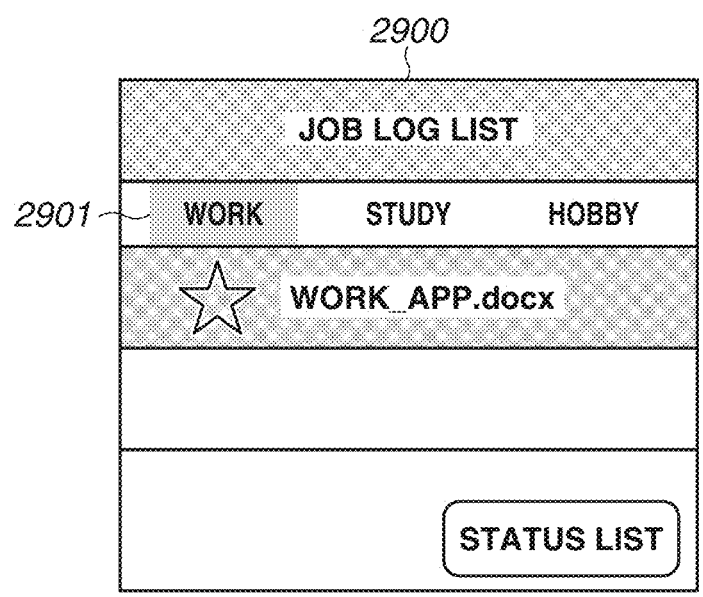
FIG. 29 illustrates an example of a display in a case where job logs are displayed for each display mode.

FIG. 28 illustrates an example of a job log list screen displaying an executed job list. At the press of a log list display button 2606, the current screen changes to the job log list screen. While a job log list screen 2800 is displayed at the press of the log list display button 2606 according to the present exemplary embodiment, any procedure for displaying the job log list screen 2800 can be used. While the print jobs and the scan jobs are listed together, the print jobs can be displayed on a screen and the scan jobs can be displayed on another screen. While print jobs and scan jobs are described herein as an example, another job (e.g., copy job) can also be displayed. In a case where there are executed jobs, the executed jobs are listed on the job log list screen 2800. In the example illustrated in FIG. 28, three job names 2801, 2802, and 2803 are displayed on the job log list screen 2800. The job name 2801 is a scan job. The job name 2802 is a print job. The job name 2803 is a print job that is input in the work mode. As in the job status list screen 2600, each job name can be given any name at the time of inputting the job. A file name of a print file can also be used but does not have to be used. Further, job input date/time and an icon 2804 from which the browse application 105 having input the job can be identified as an image can be displayed together, or the display form can be changed based on the display mode transmitted as job setting information at the time of inputting the jog. While a background of the job name 2803 is changed, any method for changing the display form can be used so that the user can recognize the display mode. For example, a color of characters of a job name can be changed. At the press of a STATUS LIST button 2805, the current screen changes to the job status list screen 2600. As in FIG. 29, executed jobs can be grouped for each display mode and displayed by group. In the example illustrated in FIG. 29, a list of executed jobs that are jobs input in the work mode is displayed, and at the press of a display mode selection button 2901, the current screen changes to a screen that displays executed jobs of another display mode (e.g., study mode). While the screen 2800 that displays an incomplete job list and the screen 2900 that displays an executed job log list are separated, incomplete jobs and executed job logs can be displayed on the same screen.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-108148, which was filed on Jul. 5, 2022 and which is hereby incorporated by reference herein in its entirety.

What is claimed is:

1. An image processing system in which a relay server configured to relay a service provided by a service server and an image processing apparatus including a local application configured to control execution of a job received from the relay server are connected together via a network,
the relay server comprising:
one or more memories, and
one or more processors, wherein the one or more processors and the one or more memories of the relay server are configured to cause the relay server to:
transmit, to the image processing apparatus, information about a screen to be displayed before execution of the job on a web browser of the image processing apparatus;

determine a display mode about a screen to be displayed during execution of the job by the local application of the image processing apparatus; and transmit, to the image processing apparatus, the job and information about the display mode determined, and the image processing apparatus comprising:

a display, one or more memories, and one or more processors, wherein the one or more processors and the one or more memories of the image processing apparatus are configured to cause the image processing apparatus to implement:

the web browser configured to control the display to display the screen to be displayed before execution of the job based on the information about the screen to be displayed on the web browser transmitted by the relay server; and the local application configured to control the display to display the screen to be displayed during the execution of the job based on the job and the information about the display mode transmitted by the relay server.

2. The image processing system according to claim 1, wherein the job is a print job for printing a file.

3. The image processing system according to claim 1, wherein the job is a scan job for executing scanning.

4. The image processing system according to claim 1, wherein the one or more processors and the one or more memories of the image processing apparatus are further configured to cause the image processing apparatus to transmit a result of execution of the job to the relay server.

5. The image processing system according to claim 1, wherein the one or more processors and the one or more memories of the relay server are further configured to cause the relay server to determine the display mode based on at least one of a type of the service provided by the service server or a type of the image processing apparatus.

6. A relay server configured to relay a service provided by a service server, the relay server comprising:

one or more memories, and one or more processors, wherein the one or more processors and the one or more memories of the relay server are configured to cause the relay server to:

transmit, to an image processing apparatus, information about a screen to be displayed before execution of a job on a web browser of the image processing apparatus;

determine a display mode about a screen to be displayed during execution of the job relating to the service by a local application of the image processing apparatus; and transmit, to the image processing apparatus, the job and information about the display mode determined.

7. A method for controlling a relay server configured to relay a service provided by a service server, the method comprising:

transmitting, to an image processing apparatus, information about a screen to be displayed before execution of a job on a web browser of the image processing apparatus;

determining a display mode about a screen to be displayed during execution of the job relating to the service by a local application of the image processing apparatus; and transmitting, to the image processing apparatus, the job and information about the determined display mode.

8. A non-transitory computer-readable storage medium storing instructions that, when executed by a computer of a relay server, cause the computer of the relay server to perform:

transmitting, to an image processing apparatus, information about a screen to be displayed before execution of a job on a web browser of the image processing apparatus;

determining a display mode about a screen to be displayed during execution of the job by a local application of the image processing apparatus, the job relating to a service provided by a service server; and transmitting, to the local application of the image processing apparatus, the job and information about the determined display mode.

* * * * *